(12) United States Patent
Guo et al.

(10) Patent No.: US 8,784,155 B2
(45) Date of Patent: Jul. 22, 2014

(54) MULTI-CARRIAGE SYMMETRICAL NUMERICALLY CONTROLLED COORDINATE GRINDING MACHINE

(76) Inventors: Huaizhong Guo, Xiangtan (CN); Tianrun Guo, Xiangtan (CN)

( * ) Notice: Subject to any disclaimer, the term of this patent is extended or adjusted under 35 U.S.C. 154(b) by 435 days.

(21) Appl. No.: 13/138,693

(22) PCT Filed: Jul. 10, 2011

(86) PCT No.: PCT/CN2011/077018
§ 371 (c)(1),
(2), (4) Date: Sep. 19, 2011

(87) PCT Pub. No.: WO2012/155385
PCT Pub. Date: Nov. 22, 2012

(65) Prior Publication Data
US 2012/0295516 A1    Nov. 22, 2012

(30) Foreign Application Priority Data
May 16, 2011    (CN) .......................... 2011 1 0124986

(51) Int. Cl.
*B24B 47/02* (2006.01)
*B24B 53/00* (2006.01)
*B24B 41/02* (2006.01)
*B24B 27/00* (2006.01)
*B23Q 1/62* (2006.01)

(52) U.S. Cl.
CPC ............ *B24B 27/0046* (2013.01); *B23Q 1/626* (2013.01)
USPC ............... 451/5; 451/150; 451/363; 451/393; 451/463

(58) Field of Classification Search
CPC .......... B23Q 1/015; B23Q 1/01; B23Q 1/626; B24B 27/0038; B24B 27/0046; B24B 41/00; B24B 41/02; B24B 47/00; B24B 47/02; B24B 47/22
USPC ......... 451/170, 265, 320, 340, 360, 361, 362, 451/363, 393, 463, 5
See application file for complete search history.

(56) References Cited

U.S. PATENT DOCUMENTS

| | | | | |
|---|---|---|---|---|
| 2,320,672 A * | 6/1943 | Stein | ............................. | 451/138 |
| 2,374,928 A * | 5/1945 | Frauenthal et al. | ........... | 451/160 |
| 2,736,144 A * | 2/1956 | Thatcher | ......................... | 451/28 |
| 3,135,071 A * | 6/1964 | Godar | ............................ | 451/340 |
| 3,434,514 A * | 3/1969 | McManama | ..................... | 83/745 |
| 3,998,127 A * | 12/1976 | Romeu | ............................ | 409/225 |
| 4,115,956 A * | 9/1978 | Huffman | ............................ | 451/4 |
| 4,274,231 A * | 6/1981 | Verega | ............................ | 451/5 |

(Continued)

*Primary Examiner* — Lee D Wilson
*Assistant Examiner* — Tyrone V Hall, Jr.
(74) *Attorney, Agent, or Firm* — Charles Liu

(57) ABSTRACT

The present invention includes a base, a work table, upright posts, several carriages and a grinding head. Wherein, the upright posts include for example a first upright post and a second upright post which are installed in parallel to each other on the base, and the carriages include a first carriage, a second carriage and several of third carriages; the base is connected to the first carriage and the work table is connected to the first carriage; the second carriage is positioned between the first upright post and the second upright post, the grinding head is installed on the second carriage and the third carriages are symmetrically installed on the outer sides of the first upright post and the second upright post, and each of the third carriages has a slider. The grinding machines of this invention can be used to significantly improve the operating stability and machining precision.

8 Claims, 6 Drawing Sheets

(56) References Cited

U.S. PATENT DOCUMENTS

| | | | |
|---|---|---|---|
| 4,584,794 A * | 4/1986 | Hirohata | 451/160 |
| 4,812,725 A * | 3/1989 | Chitayat | 318/625 |
| 4,907,371 A * | 3/1990 | Shoda et al. | 451/121 |
| 4,947,910 A * | 8/1990 | Reneau | 144/371 |
| 4,987,668 A * | 1/1991 | Roesch | 483/30 |
| 5,116,173 A * | 5/1992 | Goldrich | 409/13 |
| 5,146,715 A * | 9/1992 | Bando | 451/11 |
| 5,228,814 A * | 7/1993 | Suwijn | 409/12 |
| 5,688,084 A * | 11/1997 | Fritz et al. | 409/202 |
| 6,228,007 B1 * | 5/2001 | Quak et al. | 483/56 |
| 6,254,075 B1 * | 7/2001 | Kozima | 269/73 |
| 6,390,894 B1 * | 5/2002 | Beel et al. | 451/47 |
| 7,416,473 B2 * | 8/2008 | Belli et al. | 451/5 |
| 7,455,569 B2 * | 11/2008 | Schafer et al. | 451/11 |
| 8,403,728 B2 * | 3/2013 | Chen | 451/150 |
| 2010/0210186 A1 * | 8/2010 | Panuska et al. | 451/38 |

* cited by examiner

MULTI-CARRIAGE SYMMETRICAL NUMERICALLY CONTROLLED COORDINATE GRINDING MACHINE

FIELD OF THE INVENTION

The present invention relates to a machining tool, especially a multi-carriage symmetrical numerically controlled coordinate grinding machine.

BACKGROUND OF THE INVENTION

The prior art surface grinding machines usually have a plug-in structure for the entire carriages and grinding head. The surface grinding machines of such type shows some undesirable features, such as low stability and low machining precision, and the undesirable vibration caused by the grinding head because such vibration cannot be absorbed by the structure of the machine. In addition, the capacity and mode of operation of the machine are rather simple and inflexible, for example, the machine does not permit vertical surface machining. Grinding wheel dressing is required to be performed manually which results low machining precision. Furthermore, the work table and work-pieces are only allowed to do side-to-side movement along the guide rails on the base, in-process grinding wheel dressing cannot be achieved, and the processing efficiency is also rather low.

SUMMARY OF THE INVENTION

Accordingly, the present invention is directed to provide a multi-carriage symmetrical numerically controlled coordinate grinding machine. The grinding machine described herein is simple in structural features and easy to be manufactured, and possesses a high operating stability and machining precision; the grinding head of the grinding machine can be equipped with devices for automatic detection and wheel dressing; and thus fully automatic in-process machining can be achieved. Furthermore, the present invention includes a control method to for fully automatic in-process machining.

The multi-carriage symmetrical numerically controlled coordinate grinding machine (or jig grinding machine) of the present invention includes a base, a work table, upright posts, a carriage, a grinding head, a detecting device, a computer, and a wheel dresser. Wherein, the upright posts include, for example, a first upright post and a second upright post which are positioned in parallel to each other; the carriages include, for example, a first carriage, a second carriage, and a plurality of third carriages. Further, the work table is attached to the first carriage which is mounted on the base, the grinding head is attached to the first carriage; the grinding head is mounted on the second carriage which is positioned between the first upright post and the second upright post; a plurality of the third carriages are positioned symmetrically in the outer flank of the first upright post and the second upright post, and the third carriages can include, for example, a left carriage and a right carriage, on which are mounted respectively a slider; the base can include, for example, a front base and a back base, and the first upright post and the second upright post are installed on the back base, and the first upright post and the second upright post are respectively installed on the front base, and the first carriage is mounted on the back base.

The grinding machine and the components thereof are described herein with respect to three orthogonally oriented linear axes X, Y and Z, as depicted in FIG. 1, wherein the X axis is oriented from left to right, the Y axis is oriented from front to back, and the Z axis is oriented from bottom to top. With the reference of the three axes, the direction of a movement can be described accordingly, for example, as leftward or rightward, backward or forward, and downward or upward.

Furthermore, the front base can be placed with a plurality of first guide rails, for example a Y-axis guide rail and an X-axis guide rail, and the first carriage is slidingly connected to the front base via a plurality of first threaded rods, for example a Y-axis threaded rod and an X-axis threaded rod, which are engaged respectively to a plurality of the first guide rails, for example the Y-axis guide rail and the X-axis guide rail; and the front base is further installed with a first servo motor and a second servo motor, for example a Y-axis servo motor and an X-axis servo motor, to drive the first carriage; the second carriage can have a second threaded rod, and the second threaded rod connects to the second servo motor; on the base, the back base for example, is installed with the first upright post and the second upright post, and on the first upright post and the second upright post are installed a plurality of second guide rails, for example an inner guide rail and an outer guide rail, between the first upright post and the second upright post is installed a transmission chamber, the transmission chamber is connected to a third servo motor, and the transmission chamber is also connected to a third threaded rod, and the third threaded rod is installed on the upright posts and is connected to one of a plurality of third carriages, for example the right carriage.

The sliders include a first slider, for example a right slider, and a second slider, for example a left slider, while on the first slider is installed a wheel dresser, and on the second slider is installed a detecting device, for example a optical grating rule. At the location where the grinding head is located is placed an adsorption device for example a mirror grinding adsorption device, wherein the adsorption device includes an adsorption cover, a first electrode, and a second electrode, the first electrode and the second electrode being installed respectively on the wheel spindle and the wheel grinding surface.

The first upright post and the second upright post are positioned in an arch shape.

On the plurality of the third carriage, for example the left carriage and the right carriage, can respectively installed a fourth threaded rod and a fourth servo motor which drives the slider to move.

A plurality of the first guide rails are preferably V-shaped guide rails and/or flat guide rails, and a plurality of the first threaded rods are preferably a ball threaded rods.

The servo motors are connected via a fieldbus to a computer, and then via a switching device to an Ethernet to form a control system, a touch-screen hardware platform which uses the control system is structured with a dual-CPU based on the motion numerical control (NC) chip used specially for ARM+FPGA, and a motion controller software platform which includes a database, a process intelligent optimization system and an NC process simulation system.

In order to achieve further optimal results by improving and enhancing the overall performance of the invention, the following additional measures can be adopted: The computer is connected to a motion controller, a touch screen and a power module PSM; and the power module PSM is connected to such as a spindle control module SPM and inverter control modules X-SVM, Y-SVM and Z-SVM.

To achieve the foregoing objects, the remote computer includes a touch-screen hardware platform which is structured with a dual-CPU based on the motion NC chip used specially for ARM+FPGA, and a motion controller software platform which includes a database, a process intelligent optimization system and an NC process simulation system.

Automatic programming for grinding processes of complex work-pieces: Performing post processing based on the cutter location data, process parameters, as well as type of the current NC system to generate NC machining codes corresponding to the NC system. After being tested successfully, the motion simulation module is transferred to the NC grinding machine via data communication for actual grinding processes, so as to build an automatic programming platform for grinding processes of complex work-pieces.

Grinding process motion simulation: Creating a virtual grinding environment and achieving kinematics simulation of the machining process. Through the grinding process motion simulation, the correctness and technical feasibility of the cutting path of the NC program code, to avoid procedural errors, collisions and interferences.

Optimization of the process parameters of numerically controlled jig grinding processes: Optimizing the parameters of a multi-function NC grinding process by using a mixed method based on an artificial neural network and genetic algorithms to achieve the optimization of the technological scheme.

The intelligent database of NC grinding processes: Developing expert information data extraction technologies to extract all necessary technological elements from the complex multi-function NC grinding processes, and establish systems for intelligent process optimization and process data management.

Embedded computer NC system: Constructing a hardware platform of computer numerical control (CNC) system based on a dual-CPU of motion NC chip used specially for ARM+FPGA, wherein the ARM controller, as being responsible mainly for running the management related tasks, is the major control CPU of the system; and the motion NC chip used specially for FPGA is responsible for the tasks, such as of running the interpolation computer, which require instantaneity and heavy computing capacity, and is used specially for sophisticated interpolation operations so as to reduce the load of the ARM processor.

The present invention, compared to the prior art techniques, has many advantages, for example:

(1) The present invention provides a grinding machine having a low base, wherein, a first carriage, capable of moving rightward and leftward as well as forward and backward, is attached on a first guide rail, a second carriage is positioned in the inner side of the parallel upright posts, a grinding head is hung below the second carriage, and on both sides of each of a plurality of third carriages are installed a slider which is capable of moving forward and backward; the grinding machines described herein possesses a multi-carriage symmetrically embedded structure so that stability of the machine is enhanced, and the numerical control coordinate technology is applied to surface grinding machines so that the process efficiency can be improved.

(2) The slider as described herein can be moved upward and downward (along Z-axis) and forward and backward (along Y-axis), the second carriage can be moved upward and downward (along Z-axis) and forward and backward (along Y-axis), and the work table on the first carriage can be moved rightward and leftward (along X-axis) and forward and backward (along Y-axis). The work table, grinding head and slider, two or all three of which, can be operated in coordination with each other, so that the operational freedom of the machine can be increased and the machining versatility can be increased as well.

(3) The third carriage as described herein is mounted on both sides of the parallel upright posts, and a detecting device, for example an optical grating rule, and a dressing device, for example a wheel dresser, can be installed accordingly, so as to achieve online detection and repairs and thus to enhance the machining precision.

(4) For both of the first carriage and the work table, double V-shaped guide rails have been used in combination with static pressure unloading plastic-iron guide rails, and thus the machine as described herein is advantageous in its operational stability, machining precision, structural rigidity and vibration resistance.

(5) The coordinate shafts are driven in the condition that the base of the machine is relatively low and thus the stability of the machine is desirably high, and thus quality of grinding processes and the life-time of the machine will be increased.

The present invention can be used to improve various of surface grinding devices, especially suitable for high-precision intelligent NC coordinate grinding machines used for 3D surface machining process.

The present invention will be further described in details with the embodiments and drawings below.

DETAILED DESCRIPTION OF EMBODIMENTS

Figure 1:
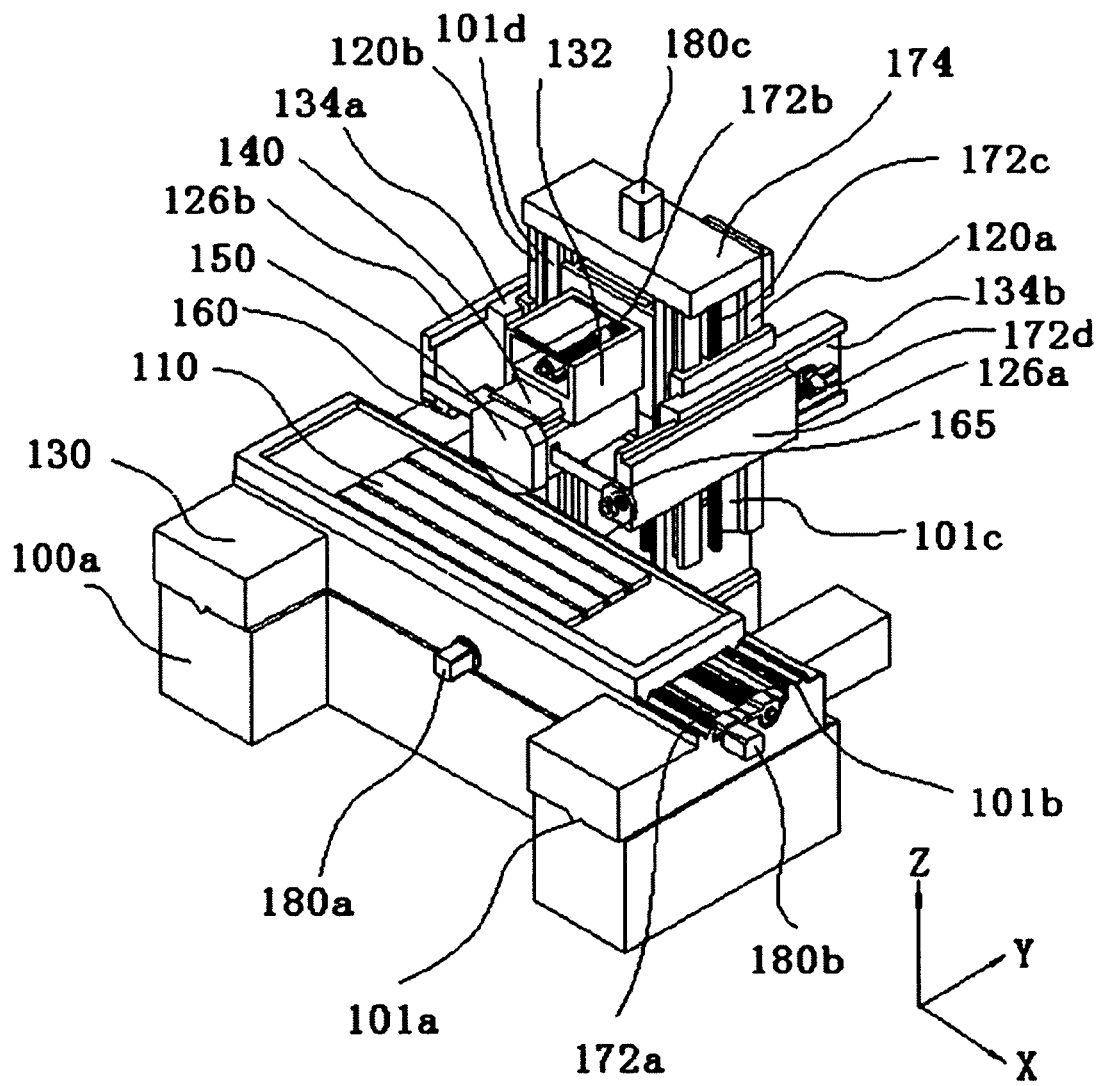
FIG. 1 is a schematic view of a multi-carriage symmetrical numerically controlled coordinate grinding machine according to an embodiment of the present invention.

The reference numbers of some major components illustrated in the drawings are listed below for convenience: Front base 100a, back base 100b, first guide rails 101a and 101b, second guide rails 101c and 101d, first threaded rod (called also X-axis threaded rod) 172a, second threaded rod 172b, third threaded rod 172c, fourth threaded rod 172d, first carriage (called also work table carriage) 130, second carriage (called also grinding head carriage) 132, third carriages 134a and 134b, first slider 126a, second slider 126b, work table 110, work-piece 131, grinding head 140, wheel spindle 142, detecting device 160, wheel dresser 165, adsorption device 150, capacitor/electromagnet 152, electrodes 155a and 155b, nozzle 153, power source 154, first servo motor 180a, second servo motor 180b, third servo motor 180c, fourth servo motor 180d, and driving gear box 174.

Figure 2:
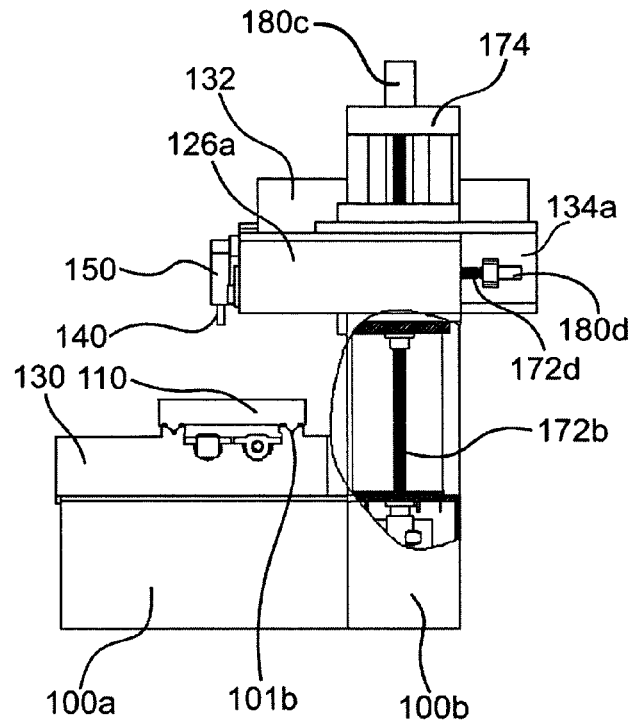
FIG. 2 is a schematic side view of a multi-carriage symmetrical numerically controlled coordinate grinding machine according to an embodiment of the present invention.

Referring to FIGS. 1 and 2, the grinding machine described herein includes front base 100a, back base 100b, work table 110, a plurality of upright posts, a plurality of carriages, grinding head 140, detecting device 160, computer (not shown), and wheel dresser 165. Wherein, a set of upright posts, installed in parallel, include for example a first upright post 120a and a second upright post 120b, and the carriages include a first carriage (called also work table carriage) 130, a second carriage (called also grinding head carriage) 132, third carriages including a left carriage 134b and a right carriage 134a; the work table carriage 130 is attached to the front base 100a, and on the work table carriage 130 is further installed the work table 110; the grinding head carriage 132 is positioned between the first upright post 120a and the second upright post 120b, and grinding head 140 is mounted under the grinding head carriage 132, the left carriage 134b and the right carriage 134a are mounted symmetrically on the outer sides of the first upright post 120a and the second upright post 120b, and a left slider 126b and a right slider 126a are mounted respectively on the left carriage 134b and the right carriage 134a. In FIGS. 1 and 2, two exemplary upright posts are shown. In fact, more than two upright posts can be installed based on different embodiments. On the left carriage 134b and the right carriage 134a can respectively installed a fourth threaded rod 172d and a fourth servo motor 180d which drives a slider moving along the Y axis.

The work table carriage 130 is installed on the front base 100a, which has Y-axis guide rail 101b and X-axis guide rail 101a, and Y-axis threaded rod (not shown) and X-axis threaded rod 172a, and the work table carriage 130, driven via the Y-axis threaded rod and the X-axis threaded rod 172a, moves along the Y-axis guide rail 101b and the X-axis guide rail 101a on the front base 100a. The Y-axis guide rail 101b and the X-axis guide rail 101a are preferably V-shaped guide rails and further preferably double V-shaped guide rails, and can optionally further include double flat guide rails positioned in parallel with the V-shaped guide rails, and the threaded rod on the front base 100a is preferably ball threaded rod.

The first servo motor 180a and the second servo motor 180b are also installed in the front base 100a, for driving the work table carriage 130, and the second threaded rod 172b which connects to the servo motor is installed in the grinding head carriage 132; the left upright post 120b and the right upright post 120a are mounted in the back base 100b, and on each of the left upright post 120b and the right upright post 120a are installed the inner guide rail 101d and the outer guide rail 101c, between the left upright post 120b and the right upright post 120a is installed the third servo motor 180c which is coupled to a driving gear box 174, and to the driving gear box 174 is connected the third threaded rod 172c which is installed in the right upright post 120a and drives the right carriage 134a capable of moving up and down along the outer guide rail 101c.

The left upright post 120b and the right upright post 120b are able to be assembled or casted into an arch shape or inversed-U shape, wherein the arch shape can be a round arch shape, a square door shape, or other similar shapes with higher structural stability than that of a cantilever structure.

Figure 3:
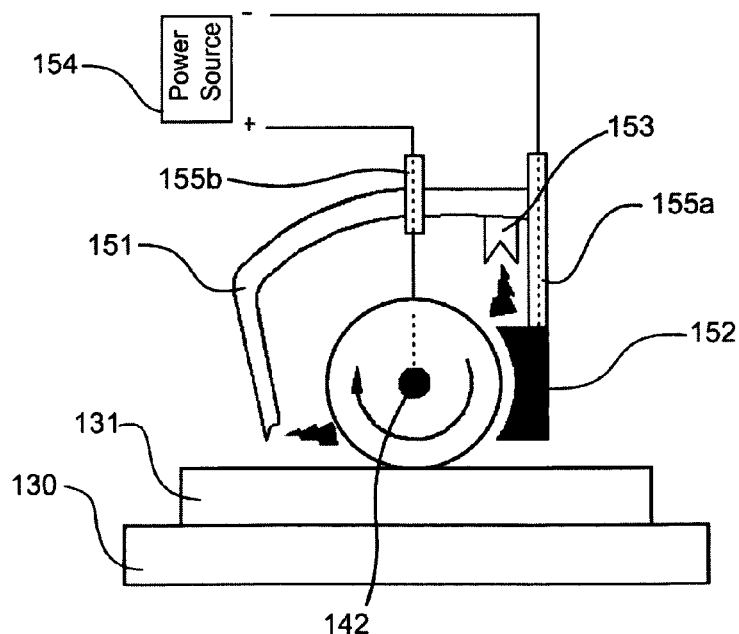
FIG. 3 illustrates schematically an adsorption device of a multi-carriage symmetrical numerically controlled coordinate grinding machine according to another embodiment of the present invention.

Referring to FIGS. 1, 2 and 3, sliders include a right slider 126a and a left slider 126b, on the right slider 126a is positioned the wheel dresser 165, on the left slider 126b is mounted the detecting device 160 for example an optical grating rule, and the adsorption device 150, for example a mirror grinding adsorption device, is mounted near the grinding head 140. The adsorption device 150 generally includes an adsorption cover 151, a first electrode and a second electrode which are installed respectively in the wheel spindle 142 and the wheel's grinding face, and a grinding fluid nozzle 153. Two electrodes are respectively installed near the center of the wheel spindle 142 and near the wheel's grinding face. When the power source 154 supplies electricity to the first electrode 152a and the second electrode 152b, an electromagnetic field will be generated in a direction away from the center of the spindle. The grinding particles and dusts will be withdrawn or attracted by the capacitor/electromagnet 152 located at the outer side of the grinding wheel, to ensure to keep the grinding wheel clean and smooth and give a smooth grinding surface of the work pieces processed.

Referring to FIGS. 1 and 2, in order to lower the center of gravity and increase the stability the entire machine in operation, some preferred embodiment of the present invention provide a grinding machine having the front base 100a with a height, i.e. that from the bottom of the front base 100a to the first carriage 130, preferably no more than 470 mm. Further, in some preferred embodiments of the present invention, the deflection H of the grinding head carriage 132 is preferably no more than 0.10 mm to increase the operating stability of the grinding head 140 and enhance the rigidity of the grinding head carriage 132.

Figure 4:
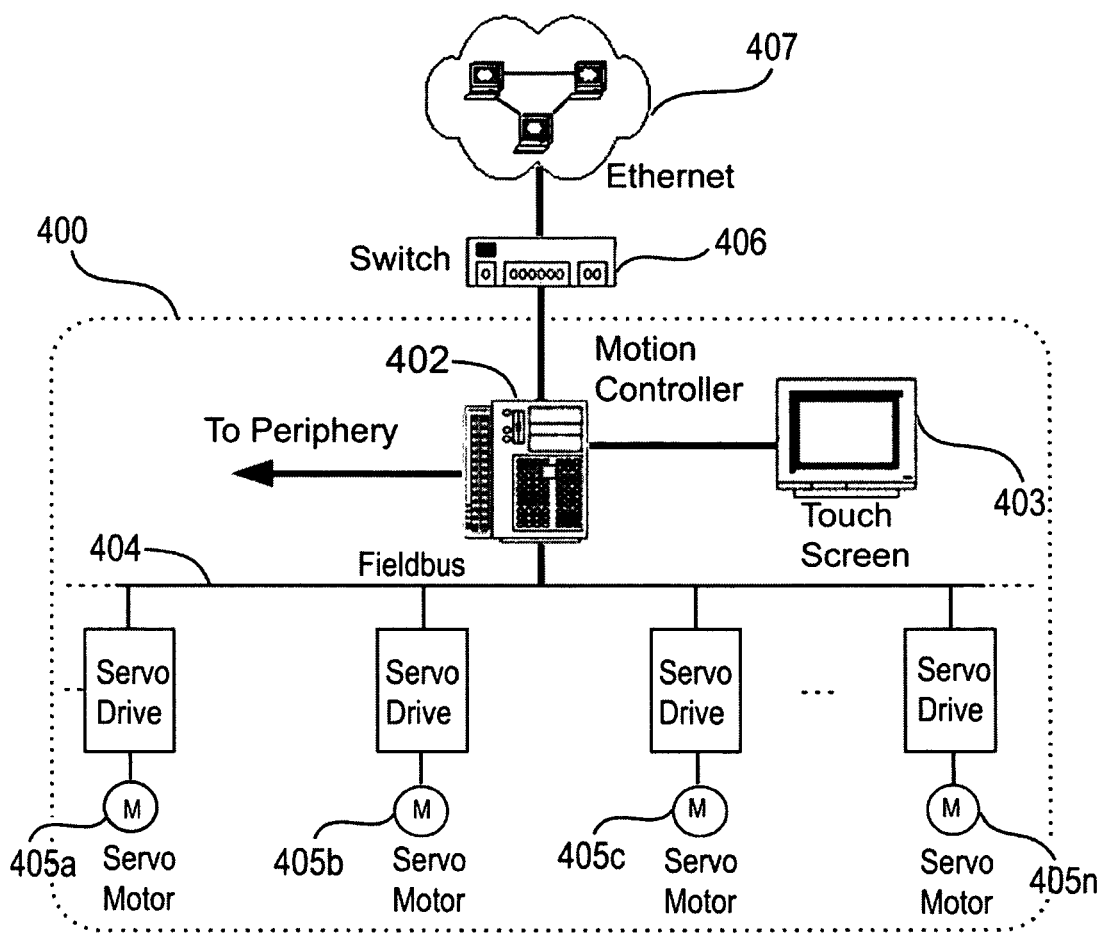
FIG. 4 is a block diagram schematically illustrating four-axis synchronous control of a multi-carriage symmetrical numerically controlled coordinate grinding machine according to another embodiment of the present invention.

FIG. 4 schematically illustrates a four-axis synchronous control system 400 of a multi-carriage symmetrical numerically controlled coordinate grinding machine in according to an embodiment of the present invention. Referring to FIG. 4, the computer connects to a motion controller 402, a touch screen 403 and a peripheral power module PSM (not shown), and is used for every four axis linkage servo motors 405a, 405b, 405c and 405n by the fieldbus 404. The four-axis synchronous control system 400, via a switch 406, is further connected to the Ethernet 407 to form a desirable control system. The "four axis" of the four-axis synchronous control system as described herein include X shaft, Y shaft, Z shaft, and the rotational spindle of the wheel dresser, as shown in FIG. 1. The X shaft in the embodiment described herein includes, for example, the work table threaded rod 172a along the X-axis; the Y shaft includes a work table Y-axis threaded rod, the threaded rod 172b installed in the grinding carriage 132, and the fourth threaded rods 172d installed respectively in each of the left carriage 134b and the right carriage 132a; and Z shaft includes an upright post threaded rod 172c.

Figure 5:
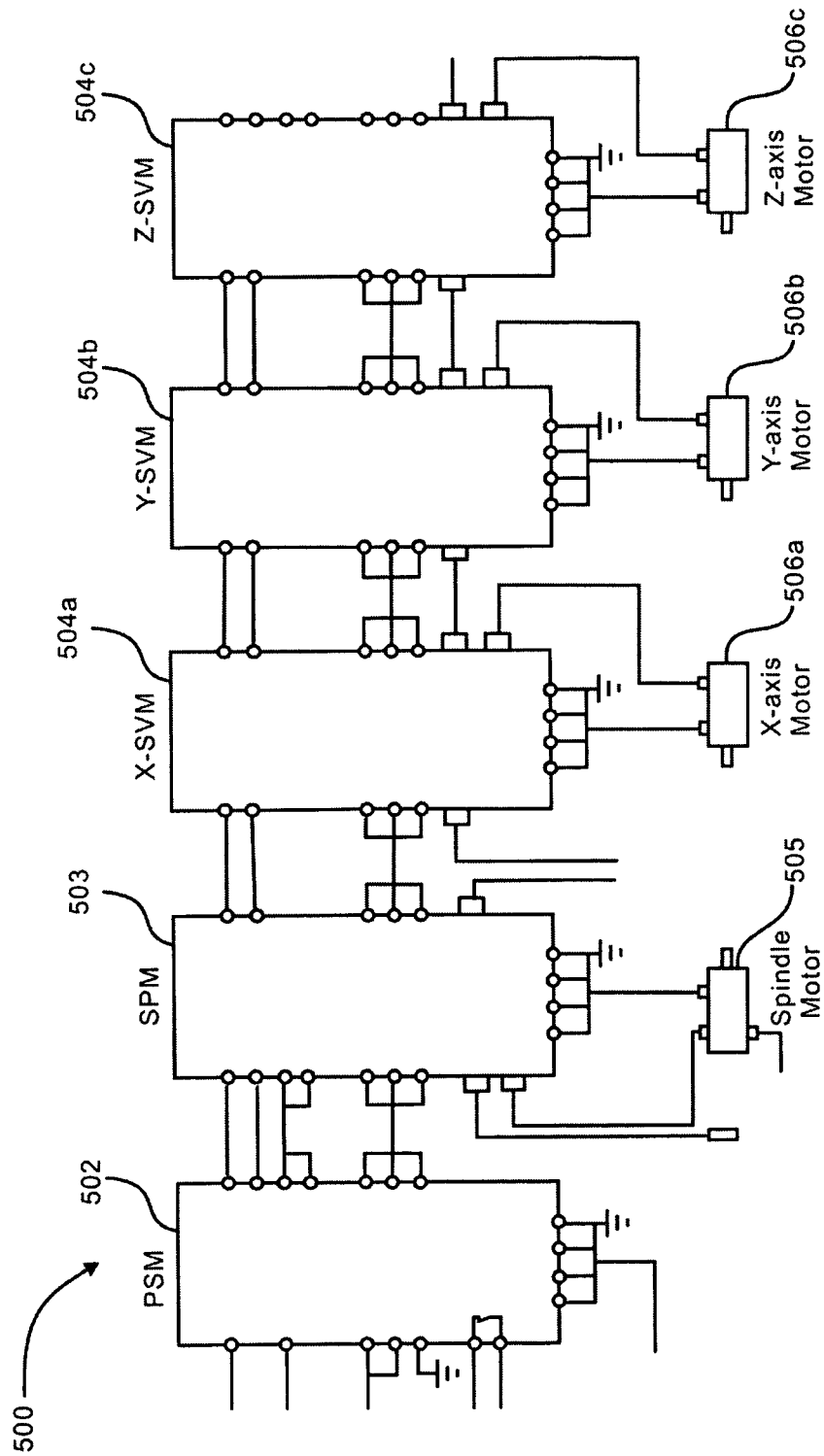
FIG. 5 is a schematic diagram illustrating a servo control system of a multi-carriage symmetrical numerically controlled coordinate grinding machine according to another embodiment of the present invention.

Referring to FIG. 5, a Fanuc C series controller is used in the servo control system 500. A PSM power control module 502 is used to supply electricity to spindle control module SPM 503, X-axis inverter control module X-SVM 504a, Y-axis inverter control module Y-SVM 504b, and Z-axis inverter control module Z-SVM 504c. In a preferred embodiment, DC power is supplied by the PSM power control module 502 to SPM 503, X-SVM 540a, Y-SVM 504b and Z-SVM 504c, the inverter of each of the axes performs the inversion process in the control module to convert DC power into AC power and supply electricity to the synchronal motor, such that the speed of the motors can be controlled through adjustment of the frequency of the inverters. Wherein PSM 502 is a power control module, SPM 503 is a spindle control module, X-SVM 504a, Y-SVM 504b and Z-SVM 504c are the inverters of X axis, Y axis and Z axis for controlling X-axis motor 506a, Y-axis motor 506b and Z-axis motor 506c, respectively. In the control system described herein, the machine is controlled via a remote computer or a human-computer interface of the machine. The control signals upon received by the motion controller, are transmitted through the fieldbus to every port of the servo controllers, so as to control each of the axial servo motors.

Embedded computer NC system: Constructing a hardware platform of computer numerical control (CNC) system based on a dual-CPU of motion NC chip used specially for ARM+FPGA, wherein the ARM controller, as being responsible mainly for running the management related tasks, is the major control CPU of the system; and the motion NC chip used specially for FPGA is responsible for the tasks, such as of running the interpolation computer, which require instantaneity and heavy computing capacity, and is used specially for sophisticated interpolation operations so as to reduce the load of the ARM processor.

The servo motors are connected via a fieldbus to a computer, and then via a switching device to an Ethernet to form a control system, a touch-screen hardware platform which uses the control system and is structured with a dual-CPU based on the motion numerical control (NC) chip used specially for ARM+FPGA, and a motion controller software platform which includes a database, a process intelligent optimization system and a NC process simulation system.

Automatic programming for grinding processes of complex work-pieces: Performing post processing based on the cutter location data, process parameters, as well as type of the current NC system to generate NC machining code corresponding to the NC system. After being tested successfully, the motion simulation module is transferred to the NC grinding machine via data communication for actual grinding processes, so as to build an automatic programming platform for grinding processes of complex work pieces.

Grinding process motion simulation: Creating a virtual grinding environment and achieving kinematics simulation of the machining process. Through the grinding process motion simulation, the correctness and technical feasibility of the cutting path of the NC program code, to avoid procedural errors, collisions and interferences.

Optimization of the process parameters of numerically controlled coordinate grinding processes: Optimizing the parameters of a multi-function NC grinding process by using a mixed method based on artificial neural network and genetic algorithms to achieve the optimization of the technological scheme.

Intelligent database of NC grinding processes: Developing expert information data extraction technologies to extract all necessary technological elements from the complex multi-function NC grinding processes, and establish systems for intelligent process optimization and process data management.

Figure 6:
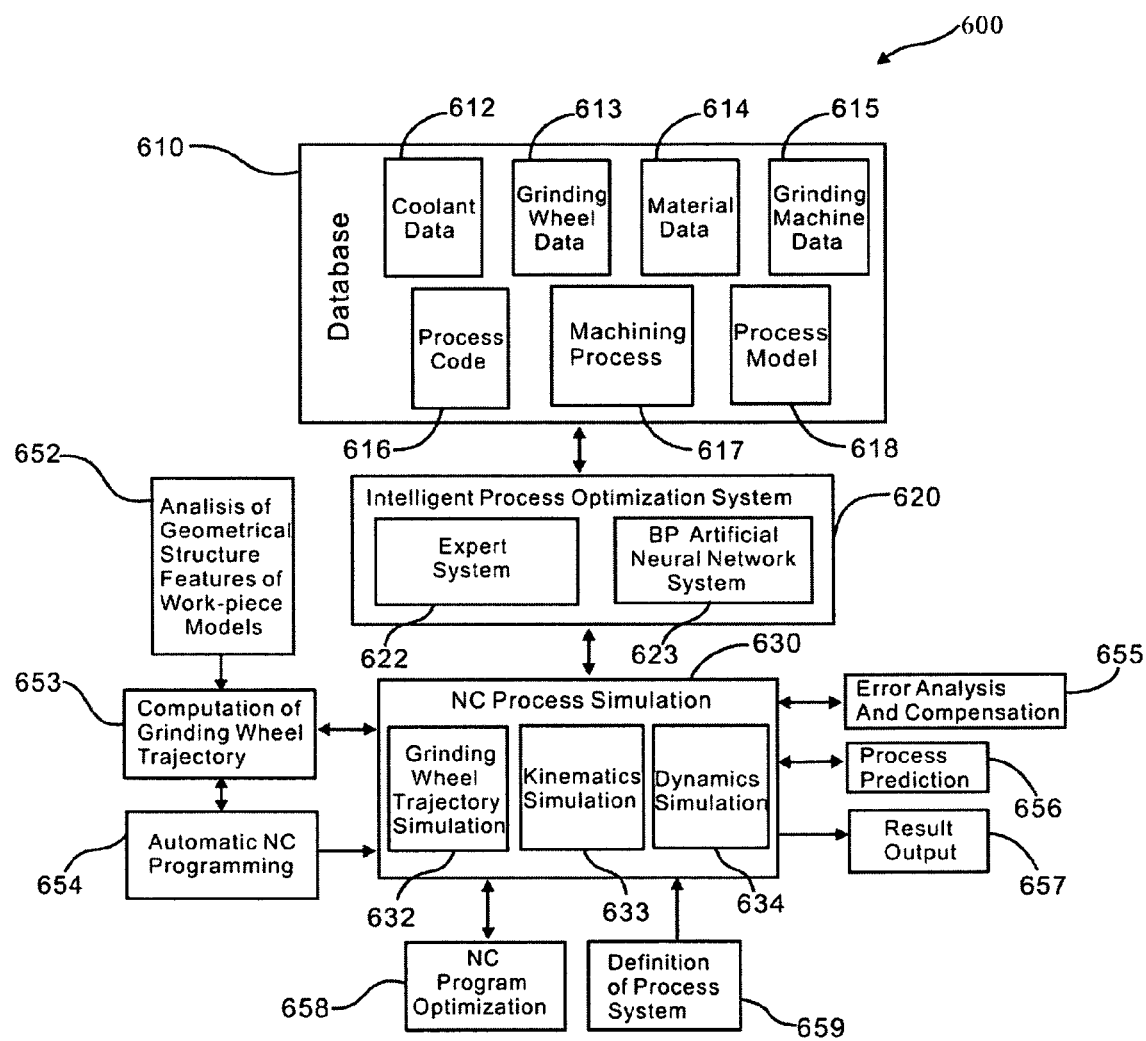
FIG. 6 is a block diagram illustrating a software platform a multi-carriage symmetrical numerically controlled coordinate grinding machine according to another embodiment of the present invention.

Referring to FIG. 6, a remote computer includes the touch screen hardware platform based on a dual-CPU of motion NC chip used specially for ARM+FPGA and the motion controller software platform 600 which includes the database 610, the process intelligent optimization system 620 and the NC processing simulation system 630. This software platform 600 is developed based on a set of grinding database. The database 610 includes coolant data 612, grinding wheel data 613, material data 614, machine tool data 615, process codes 616, machining process 617 and process models 618. Based on the above, the process intelligent optimization system 620 produces processing data through expert system 622 and BP artificial neural networks system 623, and the data can be fed back to the database 610 to enrich the contents of the database 610 to be used for same or similar process conditions in the future. For a work-piece to be processed, the work-piece models are input into the system to perform geometrical structure analysis 652 and grinding wheel trajectory calculation 653, the computed results, through automatic NC programming 654, are then transmitted to the NC processing simulation system 630 to perform dynamics simulation 632, kinematics simulation 633 and grinding wheel trajectory simulation 634, and processing error analysis and compensation 655 are conducted towards the simulation results. The simulation results are then sent to output 657. The simulation results can be further optimized through NC programming optimization 658 to give, for example, optimized wheel trajectory data for better NC programs.

Figure 7:
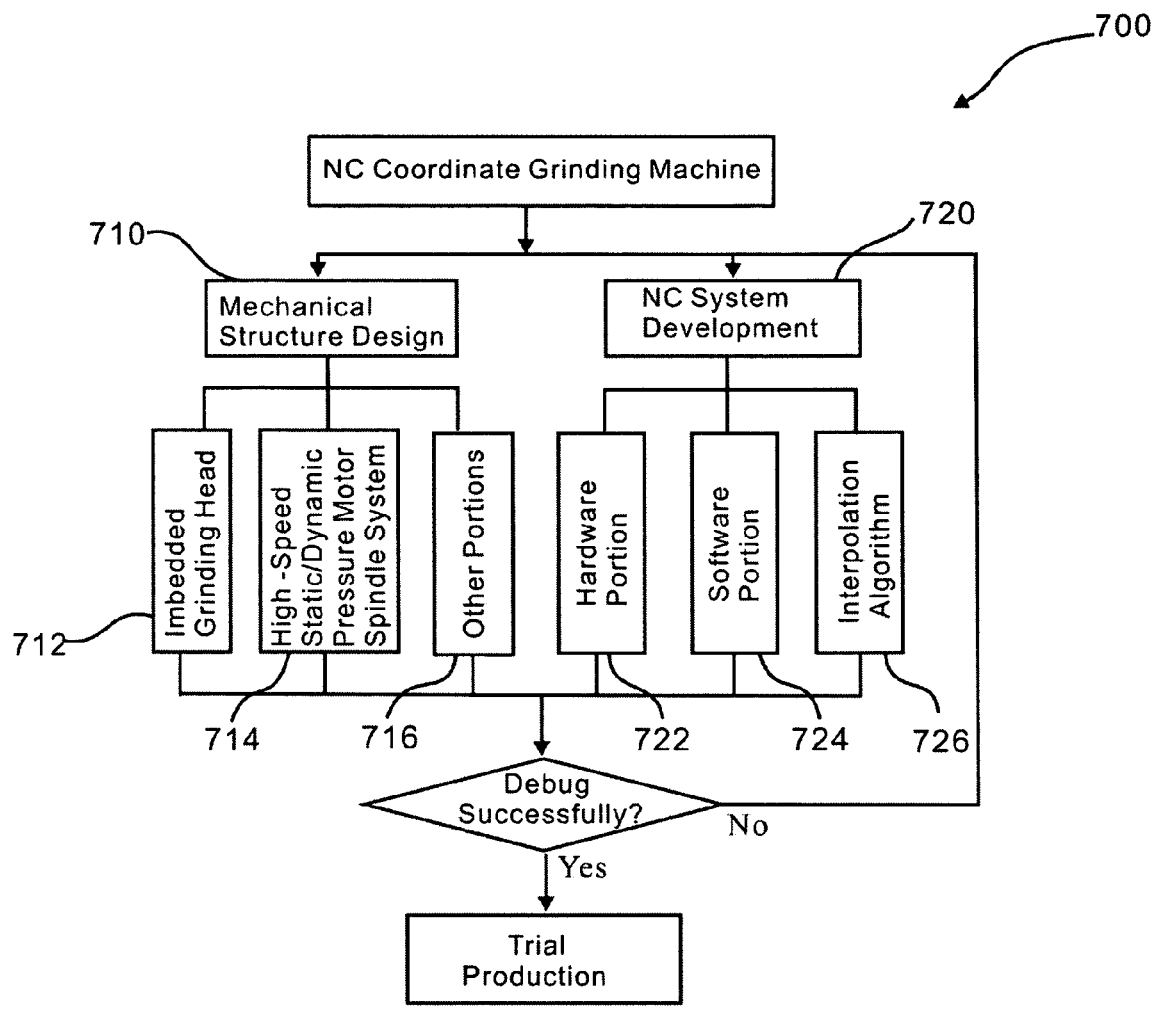
FIG. 7 is a block diagram illustrating a technical development process of a multi-carriage symmetrical numerically controlled coordinate grinding machine according to another embodiment of the present invention.

FIG. 7 illustrates a technical development process of the numerically controlled coordinate grinding machine of the present invention. Such development process includes two portions: Mechanical structure design 710 and NC system development 720. Wherein, the mechanical structure design 710 includes embedded grinding head design 712, high-speed static-dynamic pressure motor spindle design 714 and other component design 716. The NC system development 720 mainly includes hardware system development 722, software program development 724 and interpolation algorithm development 726. A debugging process is conducted once the mechanical development and NC development are finished, and a trial production is then proceeded the debugging process is proved to be successful. If the debugging process is shown undesirable, the mechanical structure design and NC system development should be restarted until desirable tests are obtained before a trial production.

Further, the lubrication system used for the grinding machine described herein is close-loop self-feeding automatic lubrication system, which can provide lubrication to the guide rails and threaded rods, to decrease the rate of wear of the guide rails and increase the machining precision and the life-time of the machine, and also get rid of the burdensome manual refueling operation. By the self-feeding lubrication, the guide rails can be supplied with oil in constant pressure, and, consequently, errors in precision of the guide rails caused by oil feeding operations between the intervals of the performance of the electromagnetic pump can be eliminated and the problem of inefficient lubrication when the machine is just restarted can be avoided, thereby desirable running conditions of the grinding machine can be ensured and the maintenance costs can be significantly reduced.

The terms "front," "back," "inner," "outer," "left" "right," "up" and "down," as used herein, are used to describe different orientations/directions of the location/movement of the components of the grinding machine stationed under ordinary operating conditions, which can be readily understood with the explanations provided above and with the reference of the X, Y and Z axes and illustrations depicted in FIGS. 1 and 2. For the grinding head, for instance, the term "front" refers to the direction that the head faces and the term "outside" refers to a relative position of a component further away from the center of the base. In addition, with a reference of the orientation when an operator faces a grinding machine ordinarily positioned, the rightward and leftward movements are along the X axis, forward and backward movements are alone the Y axis, and upward and downward movements are along the Z axis.

Some major parameters of a grinding machine according to an preferred embodiment of the present invention are listed below:

Dimension of the work table of the machine: 410×1200;
Speed of movement of the work table: 1-30;
Maximum size of the grinding surface: 400×1000;
Maximum height of the work-piece for grinding: 600;
Power of the grinding head motor: 11 Kw;
Displacement of the grinding head: 460;
Roughness of the grinding surface of work-pieces: Ra0.1;
Degree of parallelism between the grinding surface of the work-piece and the base level: 300/0.003;

Maximum difference in height of the curved surface workable in a grinding process: 150;

NC resolution: 0.001 MM;

Interpolation period of the NC system: 4 ms.

In the foregoing description and depiction, specific embodiments of the symmetrical structure of the grinding machines have been illustrated. It should be appreciated, however, that this symmetrical structure features can be applied also to other types of machine tools. In addition, the same purpose may be achieved by substitution with other embodiments different from those described herein. The scope of the invention is, therefore, indicated by the claims rather than by the foregoing description. All variations or modifications which come within the meaning and range of equivalency of the claims are within the scope of the invention.

What is claimed is:

1. A multi-carriage symmetrical NC coordinate grinding machine, comprising a base, a work table, upright posts, a plurality of carriages, and a grinding head, wherein the upright posts comprise a first upright post and a second upright post installed parallel to each other on the base, and the carriages comprise a first carriage, a second carriage and a plurality of third carriages; wherein, the first carriage is connected to the base, and the work table is connected to the first carriage; and wherein, the second carriage is installed between the first upright post and the second upright post, and the grinding head is positioned on the second carriage, the third carriages are symmetrically installed at outer sides of the first upright post and the second upright post, and each of the third carriages has a slider, and wherein the first carriage and the base are slidingly connected with a plurality of first threaded rods and a plurality of first guide rails, and a first servo motor and a second servo motor are installed in the base to drive the first carriage; wherein the second threaded rod is installed for the second carriage, and the second threaded rod is connected to the second servo motor; and wherein a plurality of the second guide rails are installed on the first upright post and the second upright post, a transmission chamber is positioned between the first upright post and the second upright post, the transmission chamber is connected to a third servo motor and also to a third threaded rod which is installed in the first upright post and is connected to one of the third carriages.

2. The grinding machine according to claim 1, wherein the sliders comprise a first slider and a second slider, and a wheel dresser is installed on the first slider, and a detecting device is installed on the second slider, and an adsorption device is installed in a place approximate to the grinding head, the adsorption device including an adsorption cover, a first electrode and a second electrode which are installed respectively in a wheel spindle and a wheel grinding face.

3. The grinding machine according to claim 1, wherein on the third carriages are respectively installed a fourth threaded rod, and a fourth servo motor that drives the sliders.

4. The grinding machine according to claim 1, wherein the first upright post and the second upright post are in an arch shape.

5. The grinding machine according to claim 1, wherein a plurality of the first guide rails are V-shaped guide rails and/or flat guide rails, and a plurality of the first threaded rods are ball threaded rods.

6. The grinding machine according to claim 1, wherein the height of the base is not over 470 mm and/or the deflection H of the second carriage is not over 0.10 mm.

7. The grinding machine according to claim 1, wherein the first servo motor, the second servo motor and the third servo motor are coupled to a computer via a fieldbus, and are further connected to an Ethernet by a switching device to form a control system; and wherein the computer is coupled respectively to a motion controller, a touch screen and a peripheral power module PSM.

8. The grinding machine according to claim 7, wherein the power module PSM further comprises a spindle control module SPM and inverter control modules X-SVM, Y-SVM and Z-SVM.

* * * * *